(12) United States Patent
Robinson et al.

(10) Patent No.: US 7,165,085 B2
(45) Date of Patent: Jan. 16, 2007

(54) ARITHMETIC CIRCUITS FOR USE WITH THE RESIDUE NUMBER SYSTEM

(75) Inventors: Steven R. Robinson, Boulder, CO (US); William A. Chren, Jr., Boulder, CO (US)

(73) Assignee: STMicroelectronics, Inc., Carrollton, TX (US)

( * ) Notice: Subject to any disclaimer, the term of this patent is extended or adjusted under 35 U.S.C. 154(b) by 86 days.

(21) Appl. No.: 11/106,109

(22) Filed: Apr. 14, 2005

(65) Prior Publication Data

US 2005/0182809 A1    Aug. 18, 2005

Related U.S. Application Data

(62) Division of application No. 09/383,478, filed on Aug. 26, 1999, now Pat. No. 6,898,613.

(51) Int. Cl.
*G06F 7/38* (2006.01)

(52) U.S. Cl. ...................................................... 708/491
(58) Field of Classification Search ................. 708/491
See application file for complete search history.

(56) References Cited

U.S. PATENT DOCUMENTS

| | | | | |
|---|---|---|---|---|
| 4,598,266 A | * | 7/1986 | Bernardson | 341/106 |
| 5,050,120 A | * | 9/1991 | Houk | 708/491 |
| 5,107,451 A | * | 4/1992 | Houk | 708/491 |
| 5,208,480 A | | 5/1993 | Ishibashi | |
| 5,892,632 A | | 4/1999 | Behrens et al. | |
| 6,163,172 A | | 12/2000 | Bazuin et al. | |

OTHER PUBLICATIONS

Chren, W.A. Jr., "One-Hot Residue Coding for Low Delay-Power Product CMOS Design", IEEE Transactions on Circuit and Systems II: Analog and Digital Signal Processing, v. 45, No. 3, Mar. 1998, pp. 303-313.
Chren, W.A. Jr., "A New Residue Number System Division Algorithm", Computers and Mathematics with Applications, vol. 19, No. 7, 1990, pp. 13-29.
N.S. Szabo, R.I. Tanka, Residue Arithmetic and Its Applications to Computer Technology, NY: McGraw-Hill, 1967, pp. 147-151.

* cited by examiner

*Primary Examiner*—Chuong D. Ngo
(74) *Attorney, Agent, or Firm*—Stephen C. Bongini; Lisa K. Jorgenson

(57) ABSTRACT

A modulo $m_i$ adder and a modulo $m_{i,j}$ scaling unit for use with an RNS. The adder includes a modulo $m_i$ barrel shifter, and a dynamic storage unit coupled to the barrel shifter to store the output of the barrel shifter. In a preferred embodiment, the dynamic storage unit includes one dynamic latch for each output line of the barrel shifter, with each of the dynamic latches including a clocked inverter in cascade with an inverter. One modulo $m_{i,j}$ scaling unit includes a modified modulo $m_i$ barrel shifter that performs both residue conversion and an arithmetic operation. The residue conversion is performed without using combinational logic. In one preferred embodiment, the modified barrel shifter performs the residue conversion though $m_i-m_j$ additional columns that replicate normal columns for all modulo $m_i$ input lines that are congruent modulo $m_j$. Another modulo $m_{i,j}$ scaling unit includes a barrel shifter-based arithmetic circuit, and a dynamic storage unit coupled to the arithmetic circuit to store the output of the arithmetic circuit.

18 Claims, 7 Drawing Sheets

ARITHMETIC CIRCUITS FOR USE WITH THE RESIDUE NUMBER SYSTEM

CROSS-REFERENCE TO RELATED APPLICATIONS

This application is a divisional of, and claims priority from application Ser. No. 09/383,478, filed Aug. 26, 1999, now U.S. Pat. No. 6,898,613. The entire disclosure of U.S. application Ser. No. 09/383,478 is herein incorporated by reference.

BACKGROUND OF THE INVENTION

1. Field of the Invention

The present invention relates to electronic circuits, and more specifically to arithmetic circuits for use with the residue number system.

2. Description of Related Art

Power consumption is now becoming a more important consideration in integrated circuit design. This has compelled circuit designers to consider reducing power consumption through changes in many different levels of the design process, such as the system, technology, algorithm, physical, and circuit levels. For example, system level approaches include power supply voltage scaling, clock gating, and subsystem sleep (or power down) modes. Technology level techniques include using dynamic threshold MOSFETs, and algorithm level techniques include using alternate number systems and state encoding. Further, physical level methods include transistor reordering, and circuit level methods include self-timed asynchronous approaches and glitch reduction. The ultra-low power circuits of the future will have to employ several of these approaches because none alone can achieve the power reduction goals for the next decade.

While all of the techniques described above advantageously reduce power consumption, many of them have a deleterious side effect of reducing the speed of the circuit. For example, supply voltage scaling lengthens the system clock period if other factors such as technology and drive strength are kept the same. For this reason, designers now consider the delay-power (DP) product of a circuit as the important factor in low power circuit design. One system level design approach that is currently being investigated due to of its potential for significant DP product reduction is the use of a One-Hot Residue Number System (OHRNS). For example, the OHRNS is being considered for use in the adaptive FIR (finite impulse response) filter and Viterbi detector of the Project Orion read channel.

The Residue Number System (RNS) is an integer number system in which the basic operations of addition, subtraction, and multiplication can be performed quickly because there are no carries, borrows, or partial products. This allows the basic operations to be performed in a single combinational step, digit-on-digit, using simple arithmetic units operating in parallel. However, other operations such as magnitude comparison, scaling (the RNS equivalent of right shifting), base extension (the RNS equivalent of increasing the bit width), and division are slower and more complicated to implement. Thus, RNS is most widely used in applications in which the basic operations predominate such as digital signal processing (DSP).

The RNS representation of an integer X is a number of digits, with each digit being the residue of X modulo a specially chosen integer modulus. In other words, X is represented as the vector of its residues modulo a fixed set of integer moduli. In order to make the RNS representation of each integer unique for all nonnegative values less than the product M of the moduli, the moduli are chosen to be pairwise relatively prime (i.e., the smallest single number into which all divide evenly is equal to the product of the moduli). Letting $m_i$ denote the $i^{th}$ modulus, the RNS representation of X is given by $X \Leftrightarrow (x_1, x_2, \ldots, x_n)$, where $x_j = X$ modulo $m_i$ and is known as the $i^{th}$ residue digit of the RNS representation of X. Table 1 shows the representation of the integers 0 to 2430 in an RNS in which $m_1=11$, $m_2=13$, and $m_3=17$ ("an 11, 13, 17 RNS representation").

TABLE 1

| Integer X | RNS digit $x_{11}$ | RNS digit $x_{13}$ | RNS digit $x_{17}$ |
|---|---|---|---|
| 2430 | 10 | 12 | 16 |
| 2429 | 9 | 11 | 15 |
| . . . | | | |
| 19 | 8 | 6 | 2 |
| 18 | 7 | 5 | 1 |
| 17 | 6 | 4 | 0 |
| 16 | 5 | 3 | 16 |
| 15 | 4 | 2 | 15 |
| 14 | 3 | 1 | 14 |
| 13 | 2 | 0 | 13 |
| 12 | 1 | 12 | 12 |
| 11 | 0 | 11 | 11 |
| 10 | 10 | 10 | 10 |
| 9 | 9 | 9 | 9 |
| 8 | 8 | 8 | 8 |
| 7 | 7 | 7 | 7 |
| 6 | 6 | 6 | 6 |
| 5 | 5 | 5 | 5 |
| 4 | 4 | 4 | 4 |
| 3 | 3 | 3 | 3 |
| 2 | 2 | 2 | 2 |
| 1 | 1 | 1 | 1 |
| 0 | 0 | 0 | 0 |

As an example, for the natural number 19, the $x_{11}$ digit is 19 mod(11)=8 (i.e., 19÷13=1 remainder 8), the $x_{13}$ digit is 19 mod(13)=6, and the $x_{17}$ digit is 19 mod(17)=2. Each RNS digit is determined without reference to any other RNS digit, and no RNS representation repeats in the range from 0 to 2430. Negative integers can be represented by limiting the represented range to an equal (or substantially equal) number of positive and negative numbers. The representation of the range from −1215 to 1215 in the 11, 13, 17 RNS representation is shown in Table 2. No separate sign is associated with the RNS representation, and the sign of the represented integer cannot be determined from any less than all of its RNS digits.

TABLE 2

| Integer X | RNS digit $x_{11}$ | RNS digit $x_{13}$ | RNS digit $x_{17}$ |
|---|---|---|---|
| 1215 | 5 | 6 | 8 |
| 1214 | 4 | 5 | 7 |
| . . . | | | |
| 7 | 7 | 7 | 7 |
| 6 | 6 | 6 | 6 |
| 5 | 5 | 5 | 5 |
| 4 | 4 | 4 | 4 |
| 3 | 3 | 3 | 3 |
| 2 | 2 | 2 | 2 |
| 1 | 1 | 1 | 1 |
| 0 | 0 | 0 | 0 |
| −1 | 10 | 12 | 16 |
| −2 | 9 | 11 | 15 |
| −3 | 8 | 10 | 14 |

TABLE 2-continued

| Integer X | RNS digit $x_{11}$ | RNS digit $x_{13}$ | RNS digit $x_{17}$ |
|---|---|---|---|
| −4 | 7 | 9 | 13 |
| −5 | 6 | 8 | 12 |
| −6 | 5 | 7 | 11 |
| −7 | 4 | 6 | 10 |
| ... | | | |
| −1214 | 7 | 8 | 10 |
| −1215 | 6 | 7 | 9 |

In the RNS, the basic operations of addition, subtraction, and multiplication are performed in digit-parallel fashion, modulo $m_i$. Thus, if operands X and Y have RNS representations of $X \leftrightarrows (x_1, x_2, \ldots, x_n)$ and $Y \leftrightarrows (y_1, y_2, \ldots, y_n)$, the result Z has an RNS representation of $Z \leftrightarrows (x_1 \circ y_1, x_2 \circ y_2, \ldots, x_n \circ y_n)$, where "$x_i \circ y_i$" represents any of the basic operations performed on the two RNS digits modulo $m_i$. More specifically, the corresponding RNS digits of the two numbers are added, subtracted, or multiplied, and then the proper modulo operation is performed on each to produce the RNS digits of the result.

For example, in the 11, 13, 17 RNS representation of Table 1, 4+15 gives (4, 4, 4)+(4, 2, 15) or (4+4 mod(11), 4+2 mod(13), 4+15 mod(17), which equals (8, 6, 2) or 19. Similarly, 19−15 gives(8−4 mod(11), 6−2 mod(13), 2−15 mod(17)), (4, 4, 4) or 4, and 6×3 gives (6×3 mod(11), 6×3 mod(13), 6×3 mod(17)), which equals (7, 5, 1) or 18. Because all individual operations are performed on each RNS digit independently and without reference to any other RNS digit, the operations can be performed completely in parallel. Thus, each of the basic operations can be performed quickly and efficiently, especially when all of the moduli are relatively small integers.

In electronic circuit implementations, addition is the fundamental RNS operation and subtraction is performed by adding the additive inverse of the subtrahend. Multiplication is also performed using addition, as will now be explained. Any prime modulus p has at least one primitive root, which is an integer $\alpha$ of order p−1 under multiplication. In other words, the primitive root is an integer $\alpha$ whose successive powers, taken modulo p, are the nonzero integers modulo p (i.e., for any $0 \leq X < p$, $X = \alpha^k$ modulo p for some $0 \leq k \leq p-2$). In such a case, X is said to have an index of k, modulo p.

Given the primitive root, multiplication modulo p can be performed by adding the indices modulo p−1. This is analogous to using logarithms in the binary number system. For example, $\alpha = 2$ is a primitive root modulo 13 because, the integers $2^0$, $2^1$, $2^2$, $2^3$, $2^4$, $2^5$, $2^6$, $2^7$, $2^8$, $2^9$, $2^{10}$, and $2^{11}$ modulo 13 are equal to 1, 2, 4, 8, 3, 6, 12, 11, 9, 5, 10 and 7, respectively. Thus, if X=5 ($2_9$ modulo 13) and Y=7 ($2^{11}$ modulo 13), X×Y=35 ($2^8$ modulo 13). Thus, the index of the product modulo p (8) of two RNS digits can be determined by adding the indices of the two RNS digits (9 and 11), modulo p−1 (i.e., (9+11) mod(12)=8).

Scaling is the RNS operation that corresponds to radix division in the binary number system (i.e., right-shifting with truncation or integer division). In the RNS, the radices are the moduli, and the scaling operation can be performed on any single modulus. Further, scaling can be performed on a combination of moduli, which corresponds to shifting by more than one bit position in the binary number system, by repeating the single modulus scaling operation. Scaling is performed using properties of division under certain limitations, as explained below.

Division (Q=N/D) can be performed with the same speed and simplicity as the three basic operations if it is known beforehand that the quotient Q is an integer and the divisor D has no zero-valued RNS digits. In such a case, the quotient Q can be determined by multiplying the dividend N with the multiplicative inverse $D^{-1}$ of the divisor ($Q = N \times D^{-1}$). Every nonzero integer modulo p has a multiplicative inverse. In particular, the multiplicative inverse is the additive inverse of the integer's index, taken modulo p−1. If X has no zero-valued RNS digit, the multiplicative inverse of X, taken modulo M, is the vector of its inverted digits. Thus, the multiplicative inversion operation can also be independently performed on each RNS digit in parallel to quickly and efficiently obtain the result.

Using these RNS properties, the scaling operation is performed by converting the dividend to a multiple of the radix and then performing radix division through inverse multiplication. The conversion is first performed by subtracting the residue of the modulus used for scaling, and then the division is performed by multiplying the converted dividend with the multiplicative inverse of the modulus. In other words, the $i^{th}$ RNS digit of X ($x_i$) is subtracted from X in order to round X to the next smaller multiple of $m_i$, and then the result is multiplied with $m_i^{-1}$ in each modulus except the $i^{th}$ to perform radix division. Thus, X scaled by modulus $m_i$ is given by the following equation.

$$\lfloor X/m_i \rfloor = (m_i^{-1}(x_1-x_i), m_i^{-1}(x_2-x_i), \ldots, m_i^{-1}(x_n-x_i)) \quad (1)$$

For example, in the 11, 13, 17 RNS representation, 47 scaled by modulus 11 $\lfloor 47/11 \rfloor$ gives ($(11^{-1}(3-3))$ mod(11), $(11^{-1}(8-3))$ mod(13), $(11^{-1}(13-3))$ mod(17)), which equals (*, 4, 4) or 4. The division operations are guaranteed to be correct because the prior subtractions ensure that the quotient is integral. However, the multiplication is not performed in the $i^{th}$ modulus because $m_i^{-1}$ does not exist modulo $m_i$. Therefore, the result of the scaling operation exists only in moduli other than the $i^{th}$ modulus, and the $i^{th}$ RNS digit is truncated as expected. While scaling does require the conversion of RNS digits from one modulus to another, this can be performed in a simple manner as described below. Further, the subtraction and multiplication operations can be independently performed on each RNS digit in parallel. If needed, the truncated RNS digit can later be restored by performing a base extension operation (not described herein).

In electronic circuit implementations, the RNS digits can be encoded in various ways. In conventional binary encoding, each RNS digit is converted to a binary number that is represented by the states of one or more lines, each of which is in one of two states to represent a binary digit of "0" or "1". There is also the "one-hot" encoding scheme in which each possible value of an RNS digit is associated with a separate two-state line. For example, in the 11, 13, 17 RNS representation, 11 lines are used to represent the first RNS digit, 13 lines are used to represent the second RNS digit, and 17 lines are used to represent the third RNS digit. When an RNS digit has a given value, the line associated with that value is high and all of the other lines are low. Thus, only one line of a digit is high (or hot) at any given time.

The use of the one-hot encoding scheme with the RNS produces such compelling advantages in electronic circuit implementations that such a system is identified as the "One-Hot Residue Number System" (OHRNS). While the OHRNS is really the same RNS with the same arithmetic properties, the advantages of using the OHRNS include basic operation implementation using barrel shifters with their superior delay-power products and operand-independent delays, simple and regular layout of arithmetic circuits, and zero-cost implementation through signal transposition of inverse calculation, index calculation, and residue conversion. When any RNS digit changes in value, at most two lines change state. This is the minimal possible activity factor and yields low power dissipation. Because in OHRNS implementations signal activity factors are near minimal and fewer critical path transistors are present, such systems have lower delay-power products. FIG. 1 shows the states of the lines of the RNS digits for representing integer 15 in an 11, 13, 17 OHRNS implementation.

With one-hot encoding of the RNS digits, addition can be performed through a cyclic shift (i.e., rotation). In particular, one of the operands is rotated by an amount equal to the value of the other operand. While such a rotation can be implemented using several different types of circuits, barrel shifters allow all possible rotations of the first operand to be computed in parallel. The second operand determines which of the rotations is output from the barrel shifter as the result. A conventional OHRNS modulo $m_i$ adder is shown in FIG. 2(a). The adder 10 includes a modulo $m_i$ barrel shifter 12 that performs the addition, and a static pipeline register 14 that stores the result for downstream processing. FIG. 2(b) shows the internal structure of the barrel shifter. As shown, NMOS pass transistors 16 are used instead of transmission gates to yield higher speed and lower power dissipation due to smaller input and output capacitive loadings (i.e., because there are half as many NMOS sources/drains per input/output line as when transmission gates are used). Additionally, the use of pass transistors lowers the area of the barrel shifter by at least half.

Further, in the OHRNS, subtraction can be performed by adding the additive inverse of the subtrahend, and the additive inverse can be computed by a simple one-to-one mapping using signal transposition. FIG. 3 shows a conventional OHRNS modulo $m_i$ subtractor. As shown, the subtractor 20 is identical to the adder 10 of FIG. 2(a) except for the use of signal transposition 22 on the subtrahend input to the barrel shifter 12. The signal transposition 22 computes the additive inverse quickly and simply through a one-to-one mapping, as described below.

Multiplication in the OHRNS can also be performed with barrel shifters by using indices. Indices and their additive inverses, which are known as anti-indices, are the RNS equivalents of logarithms and antilogarithms, as explained above. The computation of indices and anti-indices in any modulus can be performed quickly and simply through a one-to-one mapping. In particular, such mappings in the OHRNS are implemented by merely permutating the signal lines of the RNS digit. In other words, indices and anti-indices can be computed through signal transpositions or wire permutations that require no active circuitry and introduce little or no delay. An exemplary signal transposition is shown in FIG. 4.

FIG. 5 shows a conventional OHRNS modulo $m_i$ multiplier that uses wire transpositions to compute indices and anti-indices. More specifically, the multiplier 30 uses signal transpositions 34, 36, and 38 on the input and output lines to compute the indices and anti-indices, and a barrel shifter 32 to add the indices. A small amount of combinational logic 39 is used to handle the special case in which at least one of the operands is zero-valued. The separate handling of this special case allows the barrel shifter 32 to perform addition modulo $m_i-1$, rather than modulo $m_i$. As in the adder 10 of FIG. 2(a), a static pipeline register 14 stores the resulting product for downstream processing.

If one of the multiplicands is a constant, the OHRNS multiplier does not have to perform index calculation and addition. Instead, the product can be computed by simply using a single signal transposition that performs a one-to-one mapping of the input lines for the variable multiplicand to the proper output lines. This unique feature of the OHRNS allows constant multiplication to be performed without using any active circuitry, and thus very quickly and with little or no power consumption.

Residue conversion in the OHRNS can also be performed quickly and efficiently. Conversion of an RNS digit to a larger modulus, or "zero-filling", can be performed by juxtaposing the input lines with additional low level signal lines, the number of which is equal to the difference in the moduli. On the other hand, conversion of an RNS digit to a smaller modulus, or "residue folding" can be performed through a many-to-one mapping that requires some active circuitry. In particular, all source modulus values that are congruent modulo the target modulus are mapped to that target modulus. FIG. 6 shows a conventional OHRNS folding circuit 40 that uses OR gates 42 to combine source modulus values that are congruent modulo the target modulus.

FIG. 7 shows a conventional OHRNS $m_{i,j}$ scaling unit. Such a scaling unit 50 is used to perform a scaling by modulus $m_i$ of the RNS digit of every modulus $m_j$ except modulus $m_i$ in accordance with equation (1). A signal transposition 54 is performed on the second input to compute the additive inverse of the modulo $m_j$ operand, and residue conversion 54 must also be performed to convert that operand from modulus $m_i$ to modulus $m_j$. If $m_i > m_j$, residue folding can be performed using OR gates, as described above. Another signal transposition 56 is performed on the output of the adder 52 to multiply the result of the subtraction by $m_i^{-1}$, and a static register 58 stores the result for downstream processing.

SUMMARY OF THE INVENTION

It is an object of the present invention to provide improved arithmetic circuits for use with the Residue Number System (RNS).

Another object of the present invention is to provide RNS arithmetic circuits that exhibit lower power dissipation and higher speed than conventional circuits.

A further object of the present invention is to provide an improved RNS adder. The adder uses dynamic storage techniques to eliminate the need for static latches. This increases speed because latch set up times are removed and the critical path length is shortened, and reduces power dissipation because fewer transistors are required to store the output.

Yet another object of the present invention is to provide an improved RNS scaling unit that uses a modified barrel shifter. The scaling unit performs modulus conversion, subtraction, and constant multiplication, with the modified barrel shifter being used to perform both modulus conversion and subtraction. This eliminates the need for combinational logic to perform the modulus conversion, and thus increases speed and reduces power dissipation.

Still another object of the present invention is to provide an improved RNS scaling unit that uses dynamic storage techniques. This eliminates the need for static latches, and thus increases speed and reduces power dissipation.

One embodiment of the present invention provides a modulo $m_i$ adder for use with an RNS. The adder includes a modulo $m_i$ barrel shifter, and a dynamic storage unit coupled to the barrel shifter to store the output of the barrel shifter. In a preferred embodiment, the dynamic storage unit includes one dynamic latch for each output line of the barrel shifter, with each of the dynamic latches including a clocked inverter in cascade with an inverter.

Another embodiment of the present invention provides a modulo $m_{i,j}$ scaling unit for use with an RNS. The scaling unit includes a modified modulo $m_i$ barrel shifter that performs both residue conversion and an arithmetic operation. The residue conversion is performed without using combinational logic. In one preferred embodiment, the modified barrel shifter performs the residue conversion though $m_i$-$m_j$ additional columns that replicate normal columns for all modulo $m_i$ input lines that are congruent modulo $m_j$.

Yet another embodiment of the present invention provides a modulo $m_{i,j}$ scaling unit for use with an RNS. The scaling unit includes a barrel shifter-based arithmetic circuit, and a dynamic storage unit coupled to the arithmetic circuit to store the output of the arithmetic circuit. In a preferred embodiment, the dynamic storage unit includes $m_i$ dynamic latches, with each of the dynamic latches including a clocked inverter in cascade with an inverter.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

FIG. 2(*b*) is a circuit diagram showing a barrel shifter for $m_i$=5;

DETAILED DESCRIPTION OF PREFERRED EMBODIMENTS

Preferred embodiments of the present invention will be described in detail hereinbelow with reference to the attached drawings.

Figure 1:
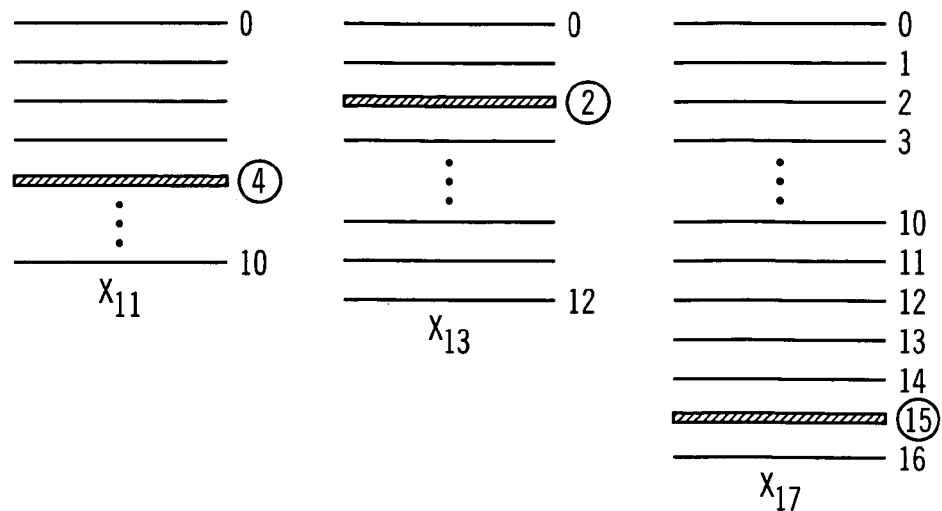
FIG. 1 is a diagram showing the representation of an integer in an exemplary OHRNS.
Figure 2A:
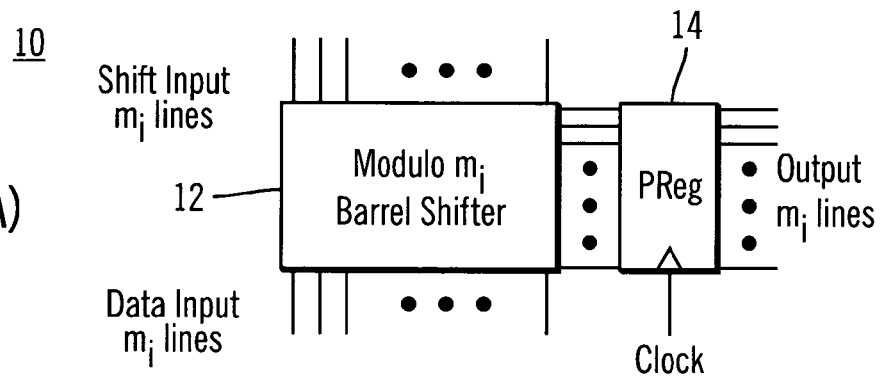
FIG. 2(*a*) is a diagram showing a conventional OHRNS modulo $m_i$ adder.
Figure 2B:
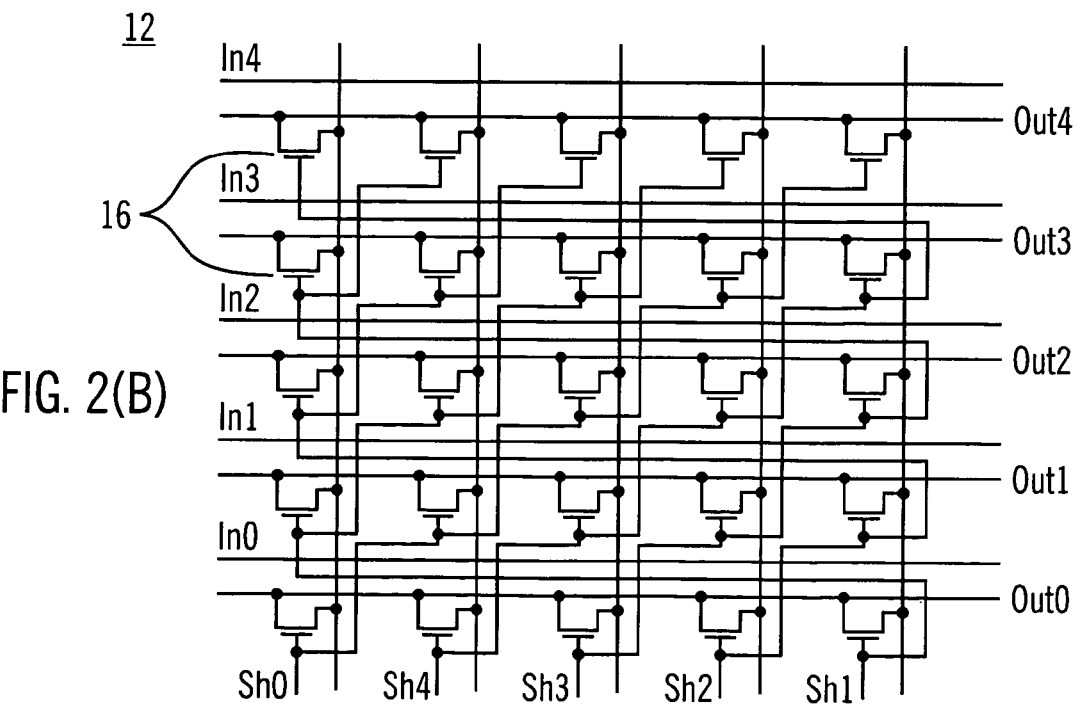
Figure 3:
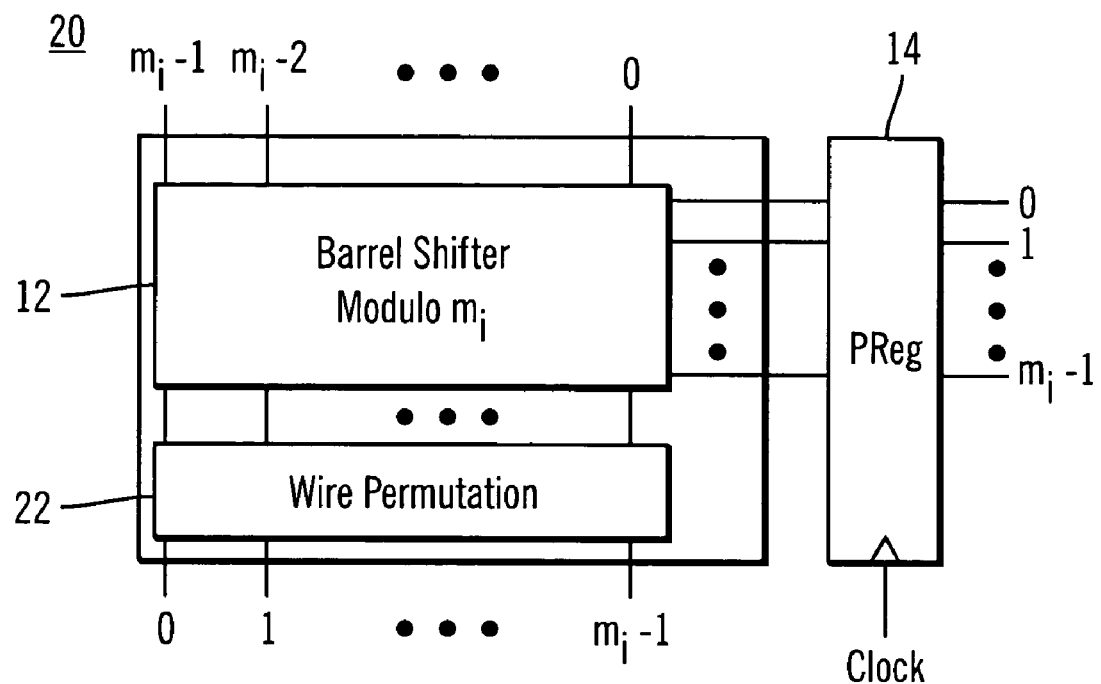
FIG. 3 is a block diagram showing a conventional OHRNS modulo $m_i$ subtractor.
Figure 4:
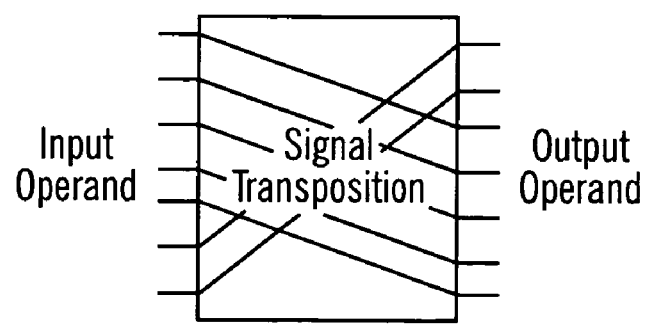
FIG. 4 is a diagram showing an exemplary signal transposition in the OHRNS.
Figure 5:
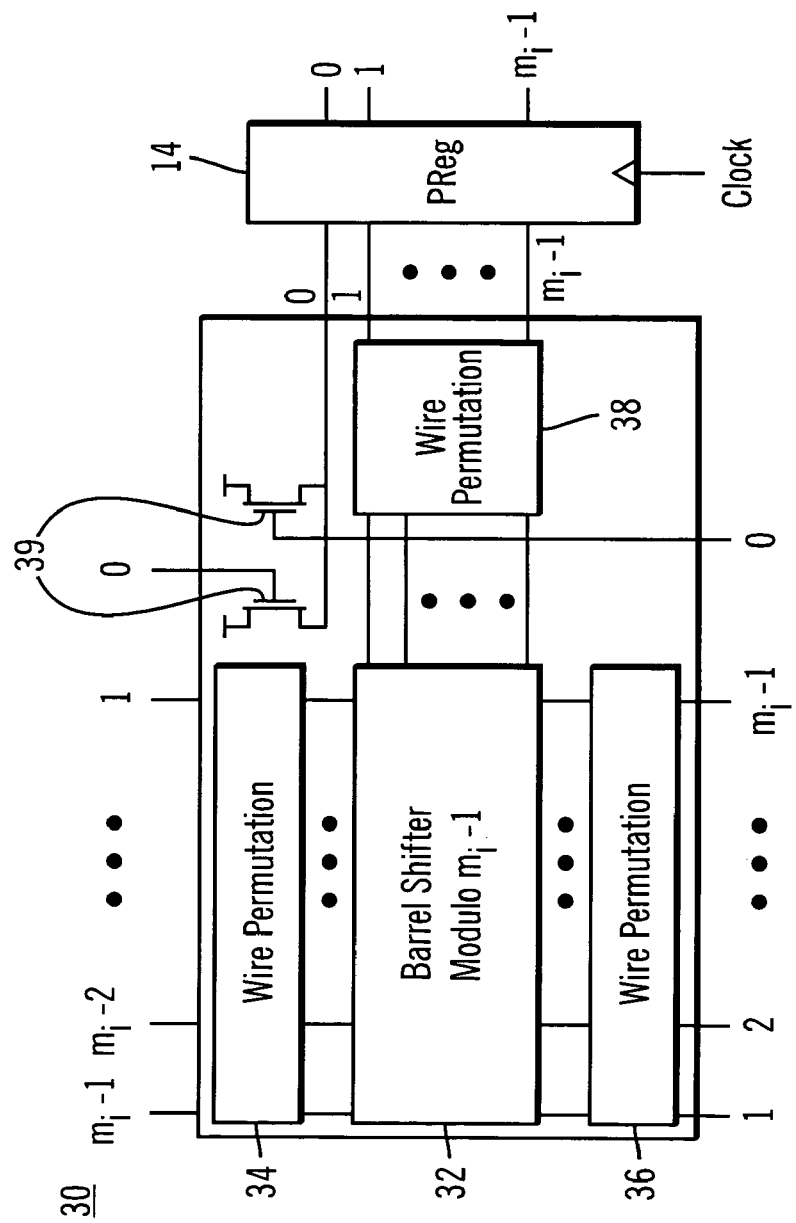
FIG. 5 is a block diagram showing a conventional OHRNS modulo $m_i$ multiplier.
Figure 6:
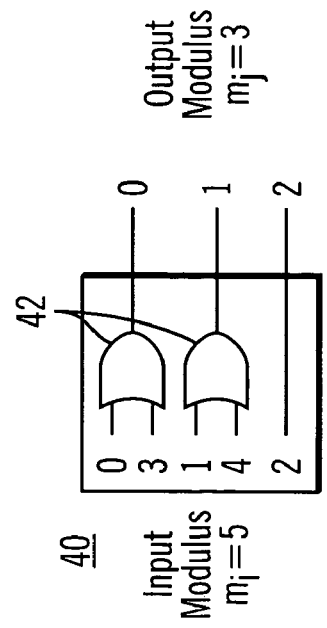
FIG. 6 is a circuit diagram showing a conventional OHRNS folding circuit.
Figure 7:
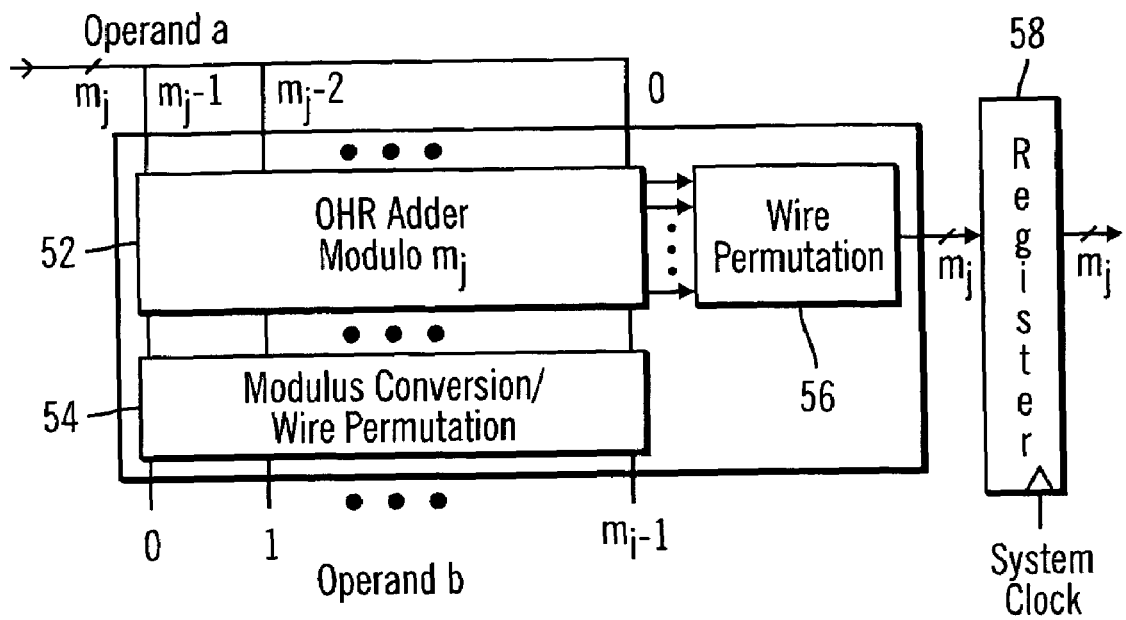
FIG. 7 is a block diagram showing a conventional OHRNS $m_{i,j}$ scaling unit.
Figure 8:
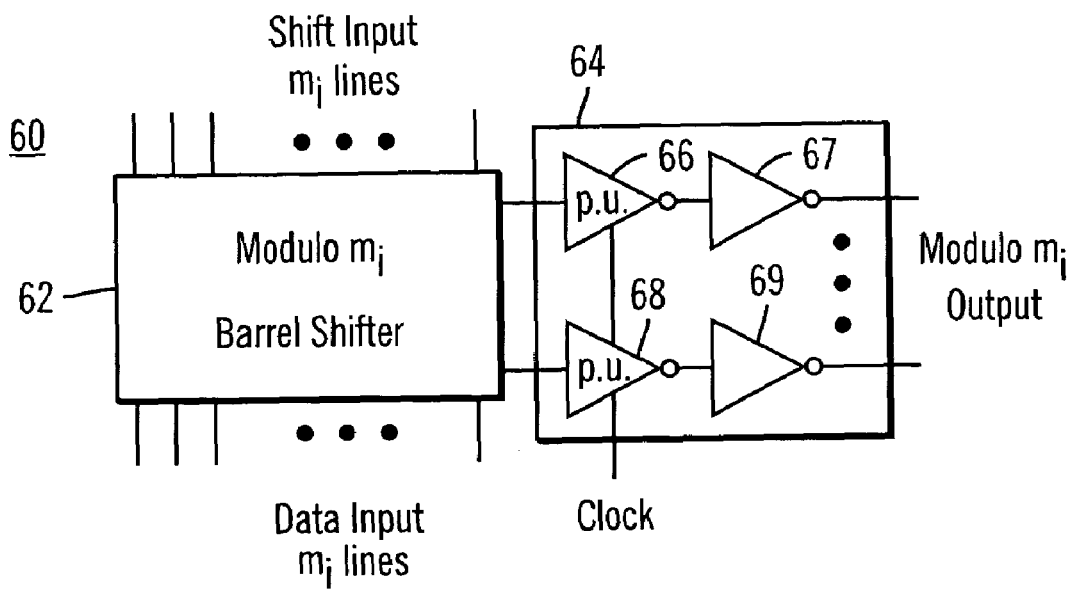
FIG. 8 is a block diagram showing an OHRNS modulo $m_i$ adder according to a preferred embodiment of the present invention.

FIG. 8 shows an OHRNS modulo $m_i$ adder according to a preferred embodiment of the present invention. As shown, the adder 60 includes a barrel shifter 62 and a dynamic storage unit 64. The barrel shifter 62 computes the sum of the two operands as in the conventional OHRNS adder. In the illustrated embodiment, the dynamic storage unit 64 includes two cascaded inverter stages 66 and 67 for each output line of the barrel shifter 62. The cascaded inverter stages 66 and 67 dynamically latch the output of the barrel shifter 62 for downstream circuits by using a clocked inverter 66 as the first inverter in the cascade.

Figure 9:
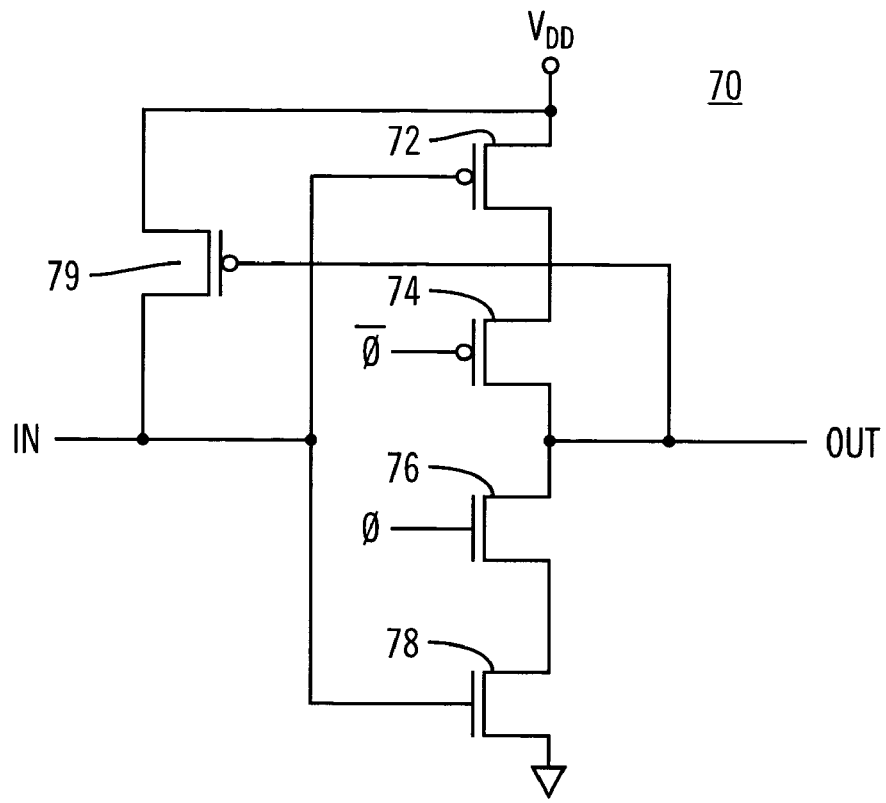
FIG. 9 is a circuit diagram showing one embodiment of the clocked latch of the OHRNS adder of FIG. 8.

A preferred embodiment of the clocked inverter is shown in FIG. 9. The clocked inverter 70 has two PMOS transistors 72 and 74 and two NMOS transistors 76 and 78 arranged in series between the supply voltage Vdd and ground. The gates of the outer PMOS and NMOS transistors 72 and 78 receive the output of the barrel shifter, and the inner PMOS and NMOS transistors 74 and 76 receive a clock signal φ in inverted and non-inverted form, respectively. The connection point of the inner PMOS and NMOS transistors 74 and 76 provides the output OUT of the clocked inverter.

The dynamic latching of the output of the clocked inverter 70 will now be explained. When the clock signal φ is high, the clocked inverter operates as a standard CMOS inverter. On the other hand, when the clock signal φ is low, the output of the clocked inverter is tristated. Because the output of the clocked inverter 66 is connected to the input of the second inverter 67 in the cascade, the tristate output condition causes any charge on the output node of the clocked inverter 66 to be trapped. Therefore, as long as the clock period is relatively short, the output of the second inverter 67 is held substantially steady.

Additionally, in the preferred embodiment, a pull-up transistor 79 controlled by the output OUT is connected between the supply voltage Vdd and the input IN of the latch. When pass transistors are used to implement the barrel shifter 62, high level output signals from the barrel shifter experience voltage degradation (i.e., the output signal does not swing fully to the high rail). Such degraded signal levels cause static power dissipation in downstream circuitry, and thus increase power consumption. However, output level restoration can be used to prevent such leakage power dissipation in the downstream circuitry. The pull-up transistor 79 is used to perform such voltage level restoration at the output of the barrel shifter. In particular, when the input to the clocked inverter 70 goes to the degraded high level that is output by the barrel shifter, the low level output of the inverter 70 turns on the pull-up transistor 79 to couple the input to the supply voltage Vdd (i.e., the desired high level voltage).

Thus, the OHRNS adder of the present invention employs dynamic storage techniques at the output of the barrel shifter in place of the static latch or flip-flop output storage of the conventional adder. Such dynamic output latching increases speed by eliminating setup time from the critical path and lowering the clock-to-output delay. Additionally, dynamic latching lowers power consumption by reducing the number of transistors and reducing flip-flop crowbar current. The reduced number of transistors also reduces the area of the adder. Further, preferred embodiments of the OHRNS adder of the present invention also use a pass transistor-based barrel shifter to compute the sum. As explained above, the use of pass transistors in the barrel shifter yields higher speed and lower power dissipation because the capacitive loadings are smaller, and lowers the area of the barrel shifter.

Figure 10:
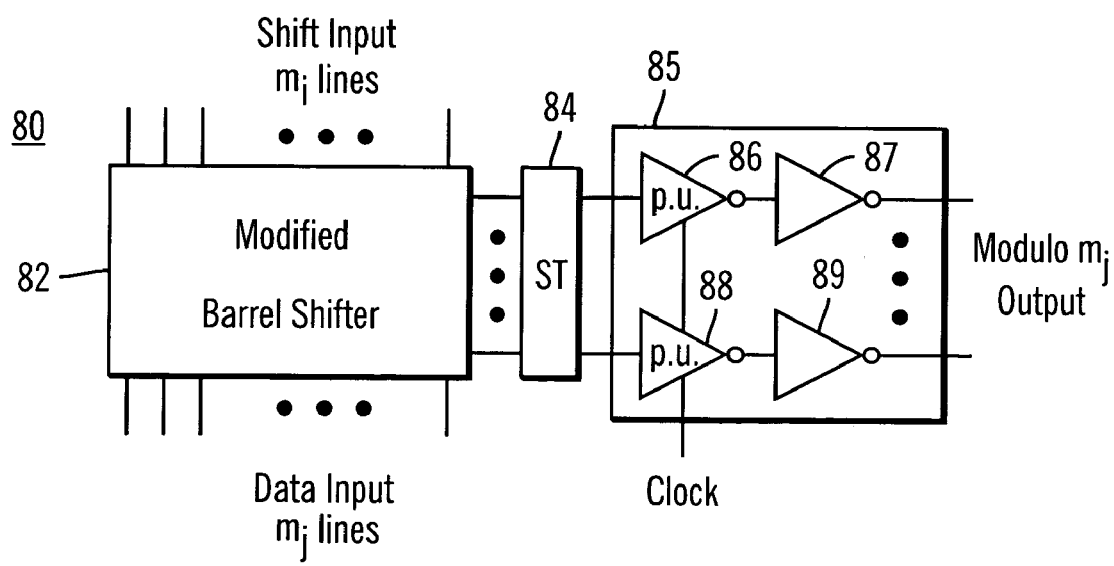
FIG. 10 is a block diagram showing an OHRNS $m_{i,j}$ scaling unit according to another preferred embodiment of the present invention.

FIG. 10 shows an OHRNS $m_{i,j}$ scaling unit according to a preferred embodiment of the present invention. As shown, the scaling unit 80 includes a modified barrel shifter 82, a signal transposition 84, and a dynamic storage unit 85. The scaling unit 80 performs, modulo $m_j$, a scaling by modulus $m_i$. More specifically, the modified barrel shifter 82 performs both residue folding and additive inverse transposition, modulo $m_j$, on the modulo $m_i$ input, and the signal transposition 84 at the output of the modified barrel shifter multiplies the result by $m_i^{-1}$. The additive inverse signal transposition is performed before the input is supplied to the barrel shifter core.

Figure 11:
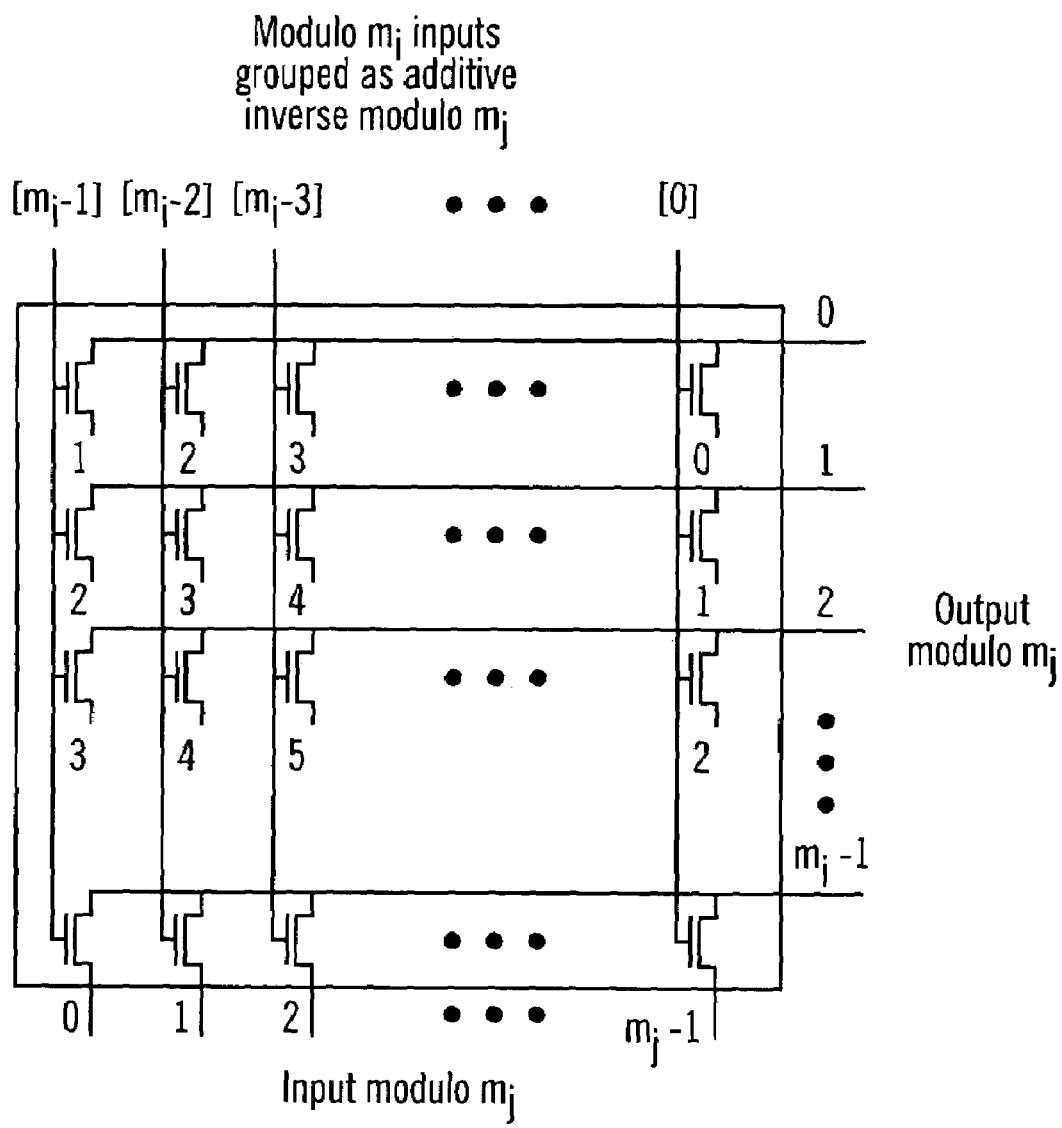
FIG. 11 is a circuit diagram showing one embodiment of the modified barrel shifter of the OHRNS scaling unit of FIG. 10.

FIG. 11 shows a preferred embodiment of the modified barrel shifter of FIG. 10. As shown, additional columns are added to the normally square barrel shifter structure to allow the unit to also perform residue folding. More specifically, the residue folding operation is performed by replicating the normal columns of the barrel shifter for all modulo $m_i$ input lines that are congruent modulo $m_j$. The replicated input lines, which are identified by brackets in FIG. 11, drive identical columns of selection transistors so as to provide identical one-to-one mappings between the input and output. In other words, additional selection transistors in an extended barrel shifter perform the residue conversion.

The required number of extra columns is equal to $m_i-m_j$, with each being driven by one of the replicated modulo $m_i$ input lines. Thus, the modified barrel shifter 90 has a rectangular shape with $m_j$ rows and $m_i$ columns. Because combinational logic is not needed to perform the residue folding operation, the OHRNS scaling unit of the present invention is faster, smaller, and uses less power than the conventional scaling unit. Further, in the preferred embodiment of FIGS. 10 and 11, the modified barrel shifter 90 uses NMOS pass transistors and the dynamic storage unit 85 includes two cascaded inverter stages 86 and 87 for each output line of the modified barrel shifter. As explained above, the use of pass transistors and dynamic output latching leads to a further speed, power, and area advantages.

Figure 12:
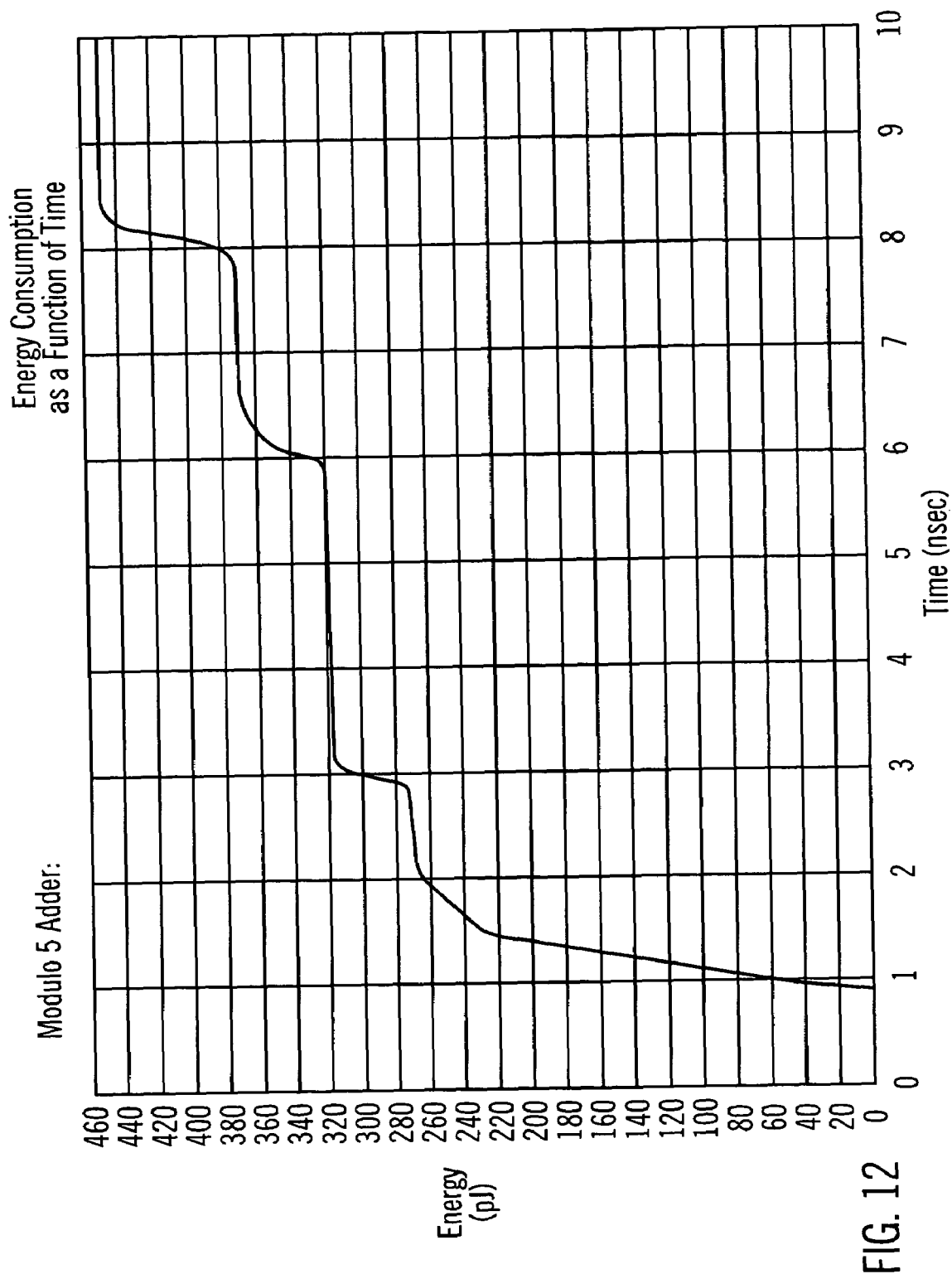
FIG. 12 is a graph showing energy consumption for the OHRNS adder of FIG. 8.

Table 3 contains simulated speed and power results for the OHRNS adder of FIG. 8 with $m_i$=5. In the simulations, the speed results were found using the slow corner (i.e., a supply voltage of 2.15 volts with TDEGC=125 and SNSPNRNC models) and the power results were found using the fast corner (i.e., a supply voltage of 2.75 volts with TDEGC=0 and FNFPNRNC models). Table 3 shows that the adder achieves a worst case speed of 784 MHz (2.15 V supply) and power dissipation 450 µA (2.75 V supply). FIG. 12 shows a plot of energy consumption versus time for a typical single sum calculation in the OHRNS adder of FIG. 8.

TABLE 3

| | |
|---|---|
| $t_{clk \rightarrow out}$ | 0.275 ns |
| $t_{in \rightarrow out}$ | 1.001 ns |
| $t_{shift \rightarrow out}$ | 1.079 ns |
| $t_{su}$ | 1.001 ns |
| $t_h$ | 0 ns |
| $f_{max}$ | 784 MHz |
| $i_{avg}$ | 69 µA |
| $i_{rms}$ | 450 µA |

Accordingly, the present invention provides improved arithmetic circuits for use with the Residue Number System.

An RNS adder according to the present invention uses dynamic storage techniques to eliminate the need for static latches. This increases speed and reduces power dissipation. An RNS scaling unit according to the present invention uses a modified barrel shifter that performs both modulus conversion and subtraction. The incorporation of the residue conversion into the shifting circuitry itself eliminates the need for combinational logic, and thus increases speed and reduces power dissipation. Further, an RNS scaling unit according to a preferred embodiment of the present invention also uses dynamic storage techniques. This further increases speed and reduces power dissipation. Thus, the RNS arithmetic circuits of the present invention achieve a lower delay-power product.

The embodiments of the present invention described above relate to specific CMOS circuit implementations and the use of "one-hot" encoding. However, the arithmetic circuits of the present invention could also be implemented using other integrated circuit technologies and other encoding schemes (e.g., a "one-cold" encoding scheme). Similarly, while the above embodiments are described in relation to clocked inverter-based dynamic latching, any type of dynamic circuit can be used to implement the dynamic storage unit used in the present invention. For example, the circuit of FIG. 9 could be altered so as to supply the input to the inner transistors and clock signals to the outer transistors. Likewise, signal transposition may be achieved in various manners (e.g., through a simple renaming of the lines). Additionally, other design choices, such as the number and values of moduli in the RNS, the physical size and layout of the circuit elements, and the timing of the clock signals could easily be adapted by one of ordinary skill in the art. Furthermore, embodiments of the present invention may not include all of the features described above. For example, pass transistor-based barrel shifters and signal level restoration may not be included in all embodiments.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A modulo $m_{i,j}$ scaling unit for use with an RNS, said scaling unit comprising:
    a modified modulo $m_i$ barrel shifter that performs both residue conversion and an arithmetic operation,
    wherein the residue conversion is performed without using combinational logic.

2. The scaling unit as defined in claim 1, wherein the modified barrel shifter performs the residue conversion though $m_i-m_j$ additional columns that replicate normal columns for all modulo $m_i$ input lines that are congruent modulo $m_j$.

3. The scaling unit as defined in claim 2, further comprising a dynamic storage unit coupled to the modified barrel shifter, the dynamic storage unit storing the output of the modified barrel shifter.

4. The scaling unit as defined in claim 3, further comprising a signal transposition between the output of the modified barrel shifter and the dynamic storage unit.

5. The scaling unit as defined in claim 3, wherein the dynamic storage unit includes $m_i$ dynamic latches, each of the dynamic latches including a clocked inverter.

6. The scaling unit as defined in claim 5, wherein each of the dynamic latches includes the clocked inverter in cascade with an inverter.

7. The scaling unit as defined in claim 6, wherein a pull-up is connected to the input node of each of the clocked inverters.

8. The scaling unit as defined in claim 2, wherein the modified barrel shifter is formed using pass transistors.

9. The scaling unit as defined in claim 2, wherein the modified barrel shifter has a first and second inputs with $m_i$ lines and an output with $m_j$ lines.

10. The scaling unit as defined in claim 2, wherein the RNS is one-hot encoded to form an OHRNS.

11. A modulo $m_{i,j}$ scaling unit for use with an RNS, said scaling unit comprising:
    a barrel shifter-based arithmetic circuit; and
    a dynamic storage unit coupled to the arithmetic circuit, the dynamic storage unit storing the output of the arithmetic circuit.

12. The scaling unit as defined in claim 11, further comprising a signal transposition between the output of the arithmetic circuit and the dynamic storage unit.

13. The scaling unit as defined in claim 11, wherein the dynamic storage unit includes $m_i$ dynamic latches, each of the dynamic latches including a clocked inverter.

14. The scaling unit as defined in claim 13, wherein each of the dynamic latches includes the clocked inverter in cascade with an inverter.

15. The scaling unit as defined in claim 14, wherein a pull-up is connected to the input node of each of the clocked inverters.

16. The scaling unit as defined in claim 11, wherein the arithmetic circuit is formed using pass transistors.

17. The scaling unit as defined in claim 11, wherein residue folding is performed without using combinational logic.

18. The scaling unit as defined in claim 11, wherein the RNS is one-hot encoded to form an OHRNS.

* * * * *